United States Patent
den Haan

(10) Patent No.: US 12,196,597 B2
(45) Date of Patent: Jan. 14, 2025

(54) METHOD FOR OPERATING A FLOWMETER AND FLOWMETER

(71) Applicant: KROHNE AG, Basel (CH)

(72) Inventor: Arthur den Haan, Leiden (NL)

(*) Notice: Subject to any disclaimer, the term of this patent is extended or adjusted under 35 U.S.C. 154(b) by 179 days.

(21) Appl. No.: 17/804,952

(22) Filed: Jun. 1, 2022

(65) Prior Publication Data

US 2022/0390268 A1 Dec. 8, 2022

(30) Foreign Application Priority Data

Jun. 2, 2021 (DE) .................. 10 2021 114 321.7

(51) Int. Cl.
*G01F 25/10* (2022.01)
*G01F 25/00* (2022.01)

(52) U.S. Cl.
CPC .......... *G01F 25/14* (2022.01); *G01F 25/0092* (2013.01)

(58) Field of Classification Search
None
See application file for complete search history.

(56) References Cited

U.S. PATENT DOCUMENTS

| | | | |
|---|---|---|---|
| 4,996,871 A | 3/1991 | Romano | |
| 5,228,327 A | 7/1993 | Bruck | |
| 7,337,084 B2* | 2/2008 | Dutton | G01F 1/8486 |
| | | | 702/100 |
| 2005/0274200 A1* | 12/2005 | Henry | G01F 1/849 |
| | | | 73/861.356 |
| 2006/0195282 A1* | 8/2006 | Stack | G01N 9/002 |
| | | | 702/100 |
| 2008/0184815 A1* | 8/2008 | Bell | G01F 1/74 |
| | | | 73/861.356 |

(Continued)

FOREIGN PATENT DOCUMENTS

JP 2007163203 A 6/2007

OTHER PUBLICATIONS

Yokogawa Electric Corporation; "Low Flow Cut-off"; Second Edition; Jan. 2009; Retrieved from Internet: Jun. 1, 2022; 2 Pages.

(Continued)

*Primary Examiner* — Patrick Assouad
*Assistant Examiner* — Mark A Shabman
(74) *Attorney, Agent, or Firm* — Patrick D. Duplessis

(57) ABSTRACT

A method for operating a flowmeter is disclosed. The flowmeter has a sensor for capturing a measured variable indicating the flow, and for converting the measured variable into a signal. The flowmeter also has a control and evaluation unit that determines a flow measurement value for the flow from the signal and outputs an output value representing the flow measurement value. The method includes: determining flow measurement values; forming smoothed flow measurement values over a plurality of flow measurement values, respectively; and activating a low flow cut-off. When the low flow cut-off is activated, the output value is set to zero if: the current smoothed flow measurement value is below a first predetermined limit value; and a predetermined number of flow measurement values has been determined with deactivated low flow cut-off or a predetermined number of smoothed flow measurement values has been formed with deactivated low flow cut-off.

14 Claims, 6 Drawing Sheets

(56) References Cited

U.S. PATENT DOCUMENTS

| | | | | |
|---|---|---|---|---|
| 2008/0190195 A1* | 8/2008 | Duffill | ............... | G01F 1/8413 |
| | | | | 73/32 A |
| 2008/0243400 A1* | 10/2008 | Bell | ............... | G01F 1/8413 |
| | | | | 702/45 |
| 2009/0019947 A1* | 1/2009 | Henry | ............... | G01F 1/74 |
| | | | | 73/861.356 |
| 2020/0249063 A1* | 8/2020 | Greco | ............... | G01F 25/10 |

OTHER PUBLICATIONS

Endress + Hauser, People for Process Automation; "Description of Device Functions Proline Promass 80 Profibus PA, Coriolis Mass Flow Measuring System"; Retrieved from Internet: Jun. 1, 2022; 44 Pages.

\* cited by examiner

METHOD FOR OPERATING A FLOWMETER AND FLOWMETER

TECHNICAL FIELD

The invention relates to methods for operating a flowmeter, wherein the flowmeter has a sensor for capturing a measured variable indicating the flow, wherein the sensor converts the measured variable into a sensor signal, and wherein the flowmeter has a control and evaluation unit, wherein the control and evaluation unit determines a flow measurement value for the flow from the sensor signal and outputs an output value representing the flow measurement value. In addition, the invention relates to a corresponding flowmeter.

BACKGROUND

For the present invention, the measurement principle forming the basis of the flowmeter is not important, thus the invention can be used, for example, with Coriolis mass flowmeters, magnetic-inductive flowmeters, ultrasonic flowmeters, or other flowmeters. The various flowmeters have in common that a sensor captures a measured variable indicating the flow—such as, for example, in the case of magnetic-inductive flowmeters, the measuring voltage induced in the flowing medium due to charge separation in a magnetic field, which is tapped between two electrodes—and converts the measured variable into a sensor signal. In the control and evaluation unit, a flow measurement value is determined from the sensor signal and an output value representing the flow measurement value is then output. The output value can be output in quite different ways here. For example, the output value can be displayed visibly to a user, and it is also possible that the output value is merely stored in the control and evaluation unit and can be retrieved on request, for example.

In order to be able to carry out reliable flow measurement—regardless of the type of flow measurement—at least a minimum flow rate must be given. Especially with particularly low flow rates, erroneous measured values can arise due to occurring background noise—for example caused by pumps or the like. In particular, the measurement of a zero flow rate proves to be difficult in practice, since occurring background noise is incorrectly evaluated as a measurement signal.

It is known from the prior art to define a lower low flow limit value that provides a lower limit for a flow measurement value that can be measured reasonably. If the flow measurement value is below the low flow limit value, the output value is set to zero as soon as the measured flow measurement value is below the low flow limit value. If the flow measurement value is above the low flow limit value, an output value representing the flow measurement value is again output. However, especially in the measuring region around the low flow limit value, this can lead to a very erratic behavior.

SUMMARY

Thus, the object of the invention is to provide a method for operating a flowmeter with which reliable flow measurement is possible, particularly in low flow ranges. In addition, it is the object of the invention to specify a corresponding flowmeter.

In the method for operating a flowmeter according to the invention, the object is initially and essentially achieved in that the following method steps are carried out:
- determining flow measurement values
- forming smoothed flow measurement values over a plurality of flow measurement values in each case
- activating a low flow cut-off, wherein when the low flow cut-off is activated, the output value is set to zero if both of the following conditions are met:
  - the current smoothed flow measurement value is below a first predetermined limit value
  - and
  - a predetermined number of flow measurement values have been determined with deactivated low flow cut-off, or a predetermined number of smoothed flow measurement values have been formed with deactivated low flow cut-off.

In the method according to the invention, flow measurement values are thus first determined. The flow measurement values are preferably determined consecutively in time. Further preferably, the time interval of second successive flow measurement values is constant. Alternatively, the time interval of second successive flow measurement values may vary.

In a further method step, smoothed flow measurement values are formed over a plurality of flow measurement values. The formation of smoothed flow measurement values can be implemented in quite different ways. For example, low-pass filtering can be carried out, or some other type of filtering. It is also conceivable that the smoothed flow measurement value is formed by taking an average value. The specific number of flow measurement values over which a smoothed flow measurement value is formed is preferably selected based on the procedure for forming the smoothed flow measurement value.

Further, the method according to the invention is characterized in that a low flow cut-off is activated. When the low flow cut-off is activated, the output value is set to zero. Nevertheless, flow measurement values continue to be determined, i.e., even when the low flow cut-off is activated, but they are just not output. According to the invention, the low flow cut-off is only activated if both of the following conditions are fulfilled at the same time: First, the current smoothed flow measurement value must be below a first predetermined limit value. Second, a predetermined number of flow measurement values must have been determined with deactivated low flow cut-off, or alternatively, a predetermined number of smoothed flow measurement values must have been formed with deactivated low flow cut-off.

According to the invention, it has been recognized that flow measurement at low flow measurement values can be optimized by not immediately activating the low flow cut-off when the flow value falls below a limit value, but that the low flow cut-off is only activated when at least a predetermined number of flow measurement values with deactivated low flow cut-off have been determined or a predetermined number of smoothed flow measurement values have been formed. This prevents the low flow cut-off from always being immediately activated and deactivated in the case where the flow measurement values fluctuate around the limit value.

In particular, the conditions specified according to the invention, both of which must be fulfilled in order for the low flow cut-off to be activated, ensure that the output signal still responds if the flow value suddenly drops to a very low flow value, so the low flow cut-off is not activated immediately.

It has been explained that the formation of the smoothed flow measurement value can be implemented by forming an average value. Here, according to a preferred design of the method according to the invention, it is particularly advantageous that a moving average value is formed. When forming a moving average, a first average value is first formed across a window with a determined number of flow measurement values. To form a second—subsequent—average value, the window under consideration is shifted by deleting the first flow measurement value of the window and taking the first flow measurement value after the window; the window is thus shifted by one flow measurement value and a new average value is formed. The window may also be shifted by more than one flow measurement value.

In an alternative design, the smoothed flow measurement value is formed by an exponential moving average. Further alternatively, the smoothed flow measurement value is formed by a weighted moving average, or by an arithmetic or harmonic mean.

A particularly preferred design of the method according to the invention is characterized in that the predetermined number of flow measurement values or smoothed flow measurement values that must be determined or formed when the low flow cut-off is deactivated, before the low flow cut-off is activated, is numerically at least equal to the plurality of measurement values per smoothed flow measurement value.

One of the two conditions that must be met for the low flow cut-off to be activated is that the current smoothed flow measurement value is below a first predetermined limit value. In this case, the current smoothed flow measurement value is the smoothed flow measurement value formed last in time. In a particularly preferred variation, the first predetermined limit value is formed by a low flow limit value minus a first tolerance value.

The low flow limit value can be set to any value. Particularly preferably, however, the low flow limit value is based on the standard deviation of the smoothed flow measurement values and, in a very particularly preferred variation, corresponds to three times the standard deviation of the smoothed flow measurement values.

Particularly preferably, the first tolerance value is set to a value greater than the standard deviation of the smoothed flow measurement value.

So far, it has been described what conditions must be met for the low flow cut-off to be activated so that the output value is set to zero. However, the invention also includes a teaching for deactivating the low flow cut-off. The teaching for deactivating the low flow cut-off is a separate teaching of the present patent application, but is also applicable in conjunction with the teaching previously described. When the low flow cut-off is deactivated, an output value reflecting the current flow measurement value is output.

According to a preferred teaching of a method according to the invention for operating a flowmeter having a sensor for capturing a measured variable indicating the flow, wherein the sensor converts the measured variable into a sensor signal, and having a control and evaluation unit, wherein the control and evaluation unit determines a flow measurement value for the flow from the sensor signal and outputs an output value representing the flow measurement value, wherein a low flow cut-off (LFC) is activated, wherein the output value (a) is set to zero when the low flow cut-off (LFC) is activated, the following method steps being carried out:

determining flow measurement values forming smoothed flow measurement values over a plurality of flow measurement values in each case deactivating the low flow cut-off, wherein, when the low flow cut-off is deactivated, an output value corresponding to the actual flow measurement value is output when one of the following two conditions is met:

the smoothed flow measurement value is above a second predetermined limit value, or an actual flow measurement value is above a third predetermined limit value.

According to the invention, it has been recognized that erratic behavior in the activation and deactivation of the low flow cut-off is prevented if the low flow cut-off is deactivated when one of the two conditions listed above is met. Unlike the activation of the low flow cut-off, which requires two conditions to be met simultaneously, the deactivation of the low flow cut-off requires only one of the two conditions to be met.

The first condition allows deactivation of the low flow cut-off even at relatively low flow rates, provided that the smoothed flow measurement value formed over a plurality of specified flow measurement values is above the second limit value. Particularly preferably, the second predetermined limit value is formed from the low flow limit value plus the first tolerance value.

The second condition, namely the deactivation of the low flow cut-off when a current determined flow measurement value is above a third predetermined limit value, enables a fast response to a rapid, in particular strong, increase in flow.

Preferably, the third predetermined limit value is formed from the low flow limit value plus a second tolerance value, wherein further preferably the second tolerance value is greater than the first tolerance value. Particularly preferably, the second tolerance value is set to a value greater than the standard deviation of the current determined flow measurement values.

In order to further increase the accuracy of a flowmeter measurement, it is advantageous to carry out a zero point correction of the flowmeter at regular intervals. A particularly preferred variation of the method according to the invention is characterized in that a zero point correction of the flowmeter is carried out in a correction step when the low flow cut-off is activated. The variation of the method according to the invention makes it possible to carry out the zero point correction of the flowmeter during operation, i.e. during a flow measurement. In addition to a time advantage, since no "additional" zero point correction has to be carried out, this results in the advantage that subsequent measurements with deactivated low flow cut-off are carried out with the currently carried out zero point correction. This further increases measurement accuracy since the flowmeter is set to the currently prevailing conditions. A change in the zero point, which depends on various process conditions, such as the medium temperature, the ambient temperature, the viscosity of the medium or the prevailing pressure conditions, is thus corrected promptly by the method according to the invention.

The zero point correction is preferably carried out when the flow measurement value determined by the control and evaluation unit for the flow is zero, i.e. when there is actually no flow. Accordingly, it is particularly preferred that it is checked that the flow measurement value is zero before the zero point correction is carried out. Further preferably, during the execution of the zero point correction, it is further checked whether the flow measurement value assumes a value other than zero. If this is the case, the zero point correction is preferably terminated immediately.

The zero point correction can be carried out here, in particular, in a manner known from the prior art.

Particularly advantageously, a waiting time t is waited after activation of the low flow cut-off before the zero point correction is carried out. Further preferably, the zero point is determined from a plurality of measured values taken with activated low flow cut-off, for example by forming an average of these measured values.

As explained above, the low flow cut-off is deactivated as soon as one of the two conditions is met, i.e. as soon as either the averaged flow measurement value is above the second limit value or as soon as the current determined flow measurement value is above the third limit value. The deactivation of the low flow cut-off is subject to a certain reaction time, which depends on the measured flow and the set limit values.

During the reaction time, the output value is still set to zero, although "measurable" flow is already present. Accordingly, the flow rate that can be measured during the reaction time is not output as an output value. A particularly preferred variation of the method according to the invention is characterized by the following additional method steps:
  determining or retrieving the reaction time of the low flow cut-off.
  determining the flow rate after deactivation of the low flow cut-off over the period of the reaction time of the low flow cut-off
  adding the flow rate determined during the reaction time to the initial value.

Thus, according to the invention, the flow rate that is not output but can be measured is measured during the reaction time and then—when the actual flow rate is output after the reaction time has elapsed with deactivated low flow cut-off—is added to the output flow rate. The variation according to the invention has the advantage that no flow rate is disregarded when determining the flow rate. Thus, according to the invention, the amount of flow that is lost due to the inertia of the deactivation of the low flow cut-off, i.e., that flows during the reaction time, is determined.

In a particularly preferred variation, the flow determined during the reaction time is divided into several flow subsets and added up divided into a plurality output values. Thus, the entire flow rate is not added up to a single output value, but is added up in a distributed manner to several output values.

In particularly preferred variations, reaction times for different flow quantities as well as different limit values are stored in an evaluation unit of a flowmeter or can be retrieved from an evaluation unit.

In addition to the method for operating a flowmeter, the invention also relates to a flowmeter for determining a flow rate of a medium. The flowmeter comprises a sensor for capturing a measured value indicating the flow rate, wherein the sensor converts the measured value into a sensor signal. In addition, the flowmeter has a control and evaluation unit that determines a flow measurement value for the flow from the sensor signal and outputs an output value representing the flow measurement value.

In the flowmeter according to the invention, the object of the invention is achieved in that the control and evaluation unit is designed in such a way that it carries out the following process steps in the operating state of the flowmeter:
  determining flow measurement values
    forming smoothed flow measurement values over a plurality of flow measurement values in each case
  activating a low flow cut-off, wherein when the low flow cut-off is activated, the output value is set to zero when both of the following conditions are met:
    the current smoothed flow measurement value is below a first predetermined limit value
    and
    a predetermined number of flow measurement values has been determined with deactivated low flow cut-off or a predetermined number of smoothed flow measurement values has been formed with deactivated low flow cut-off.

According to particularly preferred designs of the flowmeter according to the invention, the control and evaluation unit is further designed to carry out at least one further method step described in connection with the method according to the invention in the operating state of the flowmeter.

All explanations made with respect to the method according to the invention with respect to designs of the method according to the invention with their advantages apply accordingly also to the flowmeter according to the invention and vice versa.

BRIEF DESCRIPTION OF THE DRAWINGS

In detail, there is now a plurality of possibilities for designing and further developing the method according to the invention for operating a flowmeter and the flowmeter according to the invention. For this, reference is made to the description of preferred embodiments in conjunction with the drawings.

DETAILED DESCRIPTION

Figure 1:
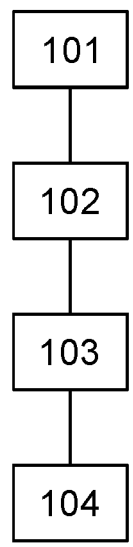
FIG. 1 illustrates a block diagram of a first design of a method for operating a flowmeter.
Figure 7:
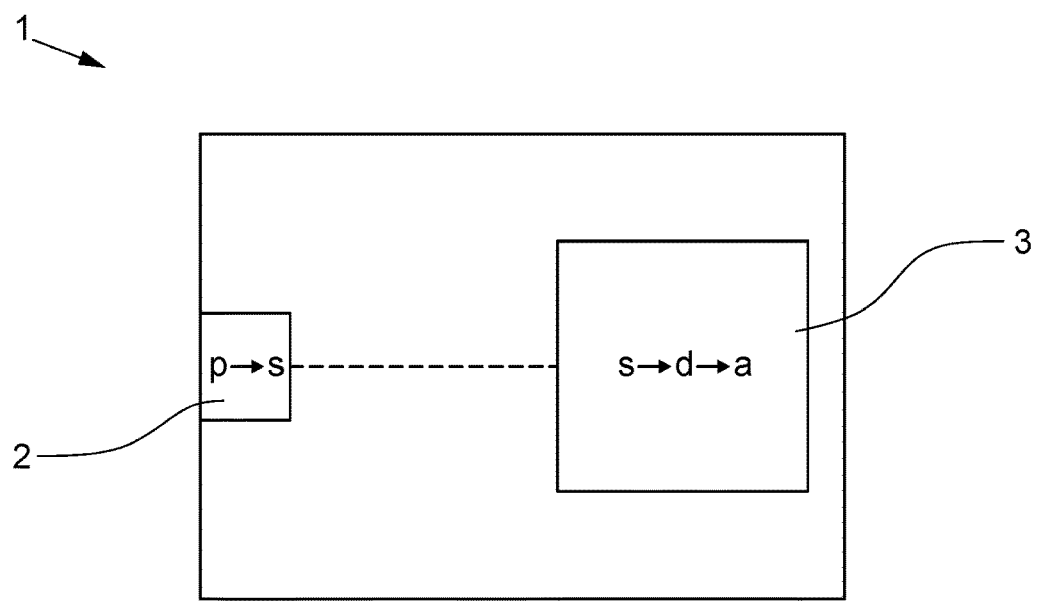
FIG. 7 illustrates a schematic representation of a flowmeter with a control and evaluation unit that can carry out the variations of the method shown above.

FIG. 1 shows a block diagram of a method 100 for operating a flowmeter 1. The flowmeter 1 is shown in FIG. 7 and has a sensor 2 which captures a measured variable p and converts the measured variable p into a sensor signal s. The sensor signal s is transmitted to a control and evaluation unit 3, wherein the control and evaluation unit 3 determines a flow measurement value d for the flow rate of the medium from the sensor signal s. In addition, the control and evaluation unit then outputs an output value a representing the flow measurement value d. The control and evaluation unit 3 of the flowmeter 1 shown is further designed such that, in the operating state of the flowmeter 1, it can carry out the further variations of the method 100.

In the variation of the method 100 shown in FIG. 1, flow measurement values d are determined in a step 101. In the example shown, the flow measurement values are determined continuously in time, wherein the time between two flow measurement values is constant here. In a further step 102, smoothed flow measurement values $d_g$ are formed over a plurality m of flow measurement values d in each case. In the present case, the smoothed flow measurement value $d_g$ is formed by forming a simple moving average. In a further method step 103, a low flow cut-off LFC is activated if the current smoothed flow measurement value $d_{g,akt}$ is below a first predetermined limit value $g_1$ and a predetermined number n of flow measurement values d have been determined with deactivated low flow cut-off LFC. In the illustrated embodiment, the number n of flow measurement values d that have been determined with deactivated low flow cut-off LFC corresponds numerically to the plurality m of flow measurement values d over which the smoothed flow measurement value $d_g$ has been formed. In the embodiment, the first limit value $g_1$ results from a low flow limit value $g_n$ minus a first tolerance value $t_1$. When the low flow cut-off LFC is activated, flow measurement values d are still determined, but the output value a is set to zero. In a further step 104, the low flow cut-off LFC is deactivated if the current smoothed flow measurement value $d_{g,akt}$ is above a second predetermined limit value $g_2$, or if the current flow measurement value $d_{akt}$ is above a third predetermined limit value $g_3$. In the embodiment, the second limit value $g_2$ results from the low flow limit value $g_n$ plus the first tolerance value $t_1$. The third limit value $g_3$, on the other hand, results, in the embodiment, from the low flow limit value $g_n$ plus a second tolerance value $t_2$. The second tolerance value $t_2$ is larger than the first tolerance value $t_1$, so that the third limit value $g_3$ is larger than the second limit value $g_2$. Here we are talking about the absolute values of the limit values or tolerance values. The magnitude of the corresponding values depends on the direction of the flow of the medium.

Figure 2:
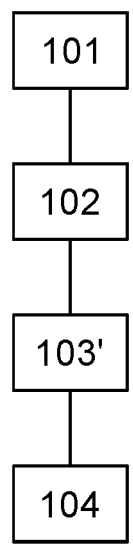
FIG. 2 illustrates a block diagram of a second design of a method for operating a flowmeter.

FIG. 2 shows a block diagram of another embodiment of the method 100. The method shown in FIG. 2 differs from the method shown in FIG. 1 in that the low flow cut-off LFC is activated in a step 103' when both the current smoothed flow measurement value $d_{g,akt}$ is below a first predetermined limit value $g_1$ and a predetermined number k of smoothed flow measurement values $d_g$ have been determined with deactivated low flow cut-off LFC.

Figure 3:
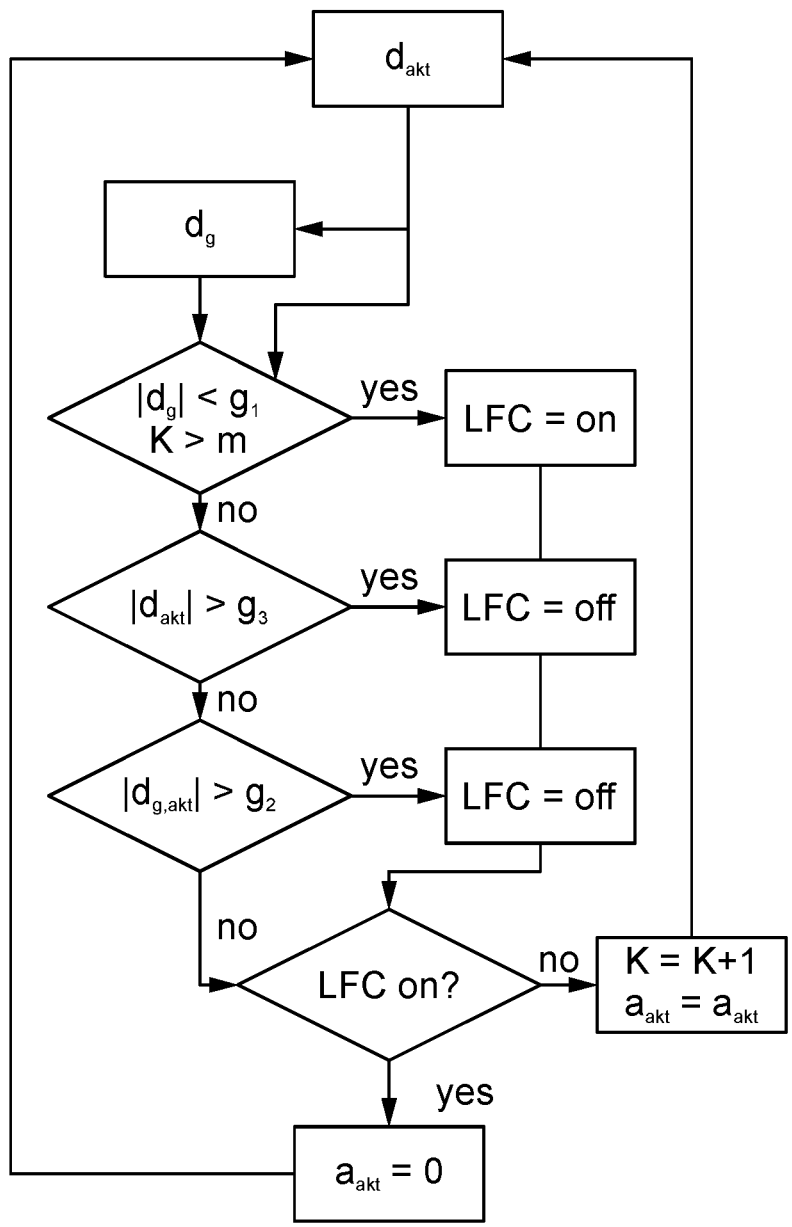
FIG. 3 illustrates a flow chart of a method for operating a flowmeter.

FIG. 3 shows a flow chart of a method 100 for operating a flowmeter 1. A current flow measurement value $d_{akt}$ is determined. Then, a smoothed flow measurement value $d_g$ is formed, wherein the smoothed flow measurement value $d_g$ is formed over the last m flow measurement values d. If the smoothed flow measurement value $d_g$ is below a first limit value $g_1$ and, in addition, the number k of smoothed flow measurement values $d_g$ formed with deactivated low flow cut-off is greater than or equal to the number m of flow measurement values d over which the sliding flow measurement value $d_g$ is formed, then the low flow cut-off LFC is activated. If the two conditions are not met, there is a possibility that the low flow cut-off LFC is already activated. A check is now made to see if the current determined flow measurement value $d_{akt}$ is above a third limit value $g_3$. If this is the case, the low flow cut-off LFC is deactivated. If this is not the case, it is further checked whether the current smoothed flow measurement value $d_{g,akt}$ is above a second limit value $g_2$. If this is the case, the low flow cut-off LFC is deactivated. Furthermore, it is then checked whether the low flow cut-off LFC is activated. If this is the case, the current output value $a_{akt}$ is set to zero. If the low flow cut-off LFC is not activated, then a current output value $a_{akt}$ is output, which represents the current flow measurement value $d_{akt}$. In addition, the number of smoothed flow measurement values $d_g$ formed is set from k to k+1 and a new current flow measurement value $d_{akt}$ is subsequently determined. The steps repeat with the new current flow measurement value.

Figure 4:
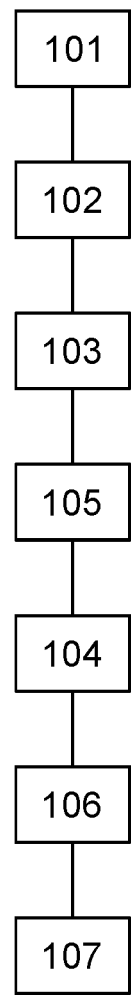
FIG. 4 illustrates a block diagram of a third design of a method for operating a flowmeter.

FIG. 4 shows a block diagram of another method for operating a flowmeter. In the method shown in FIG. 4, the first three method steps 101, 102 and 103 are carried out as explained with respect to FIG. 2. When the low flow cut-off LFC is activated, a zero point correction of the flowmeter is carried out in a correction step 108. This further increases the measurement accuracy. In a further method step 105, the reaction time of the low flow cut-off LFC is determined or retrieved from the evaluation unit of the flowmeter. In this method step, the low flow cut-off is still activated. After deactivation of the low flow cut-off LFC—method step 104—the flow rate $d_t$ is determined over the period of the reaction time—method step 105. Due to the inertia of the deactivation of the low flow cut-off LFC, this flow rate $d_t$ is not output as output value a, since it is still set to zero; the current flow measurement value $d_{akt}$ is not output as current output value $a_{akt}$ until after the end of the reaction time. As soon as the current flow measurement value $d_{akt}$ is output as the current output value $a_{akt}$, the flow $d_t$ is added to the current output value $a_{akt}$ in a further method step 107. In the illustrated design of the method, the flow rate $d_t$ is divided into a plurality t of flow rate subsets $\Delta d$. These flow rate subsets $\Delta d$ are added to the next t output values a. One flow rate subset $\Delta d$ is added up for each output value a. In the method shown, the flow rate $d_t$ is divided into flow rate subsets $\Delta d$ of equal size. This method compensates for a loss of flow due to the inertia of the low-flow cut-off LFC, so that the overall measurement accuracy of the flow measurement is increased.

Figure 5:
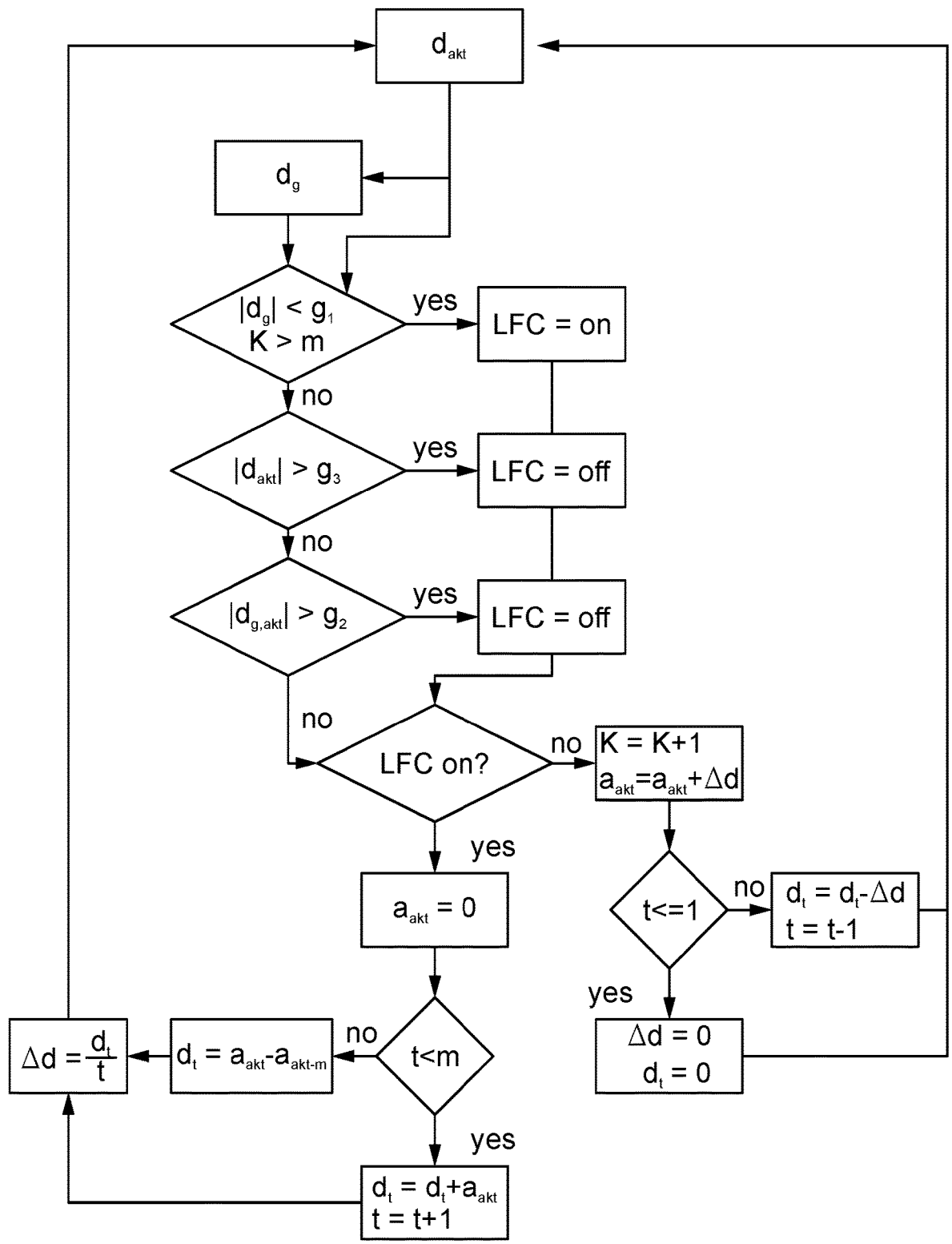
FIG. 5 illustrates a flow chart of a second method for operating a flowmeter.

FIG. 5 shows a flow chart of a method with flow loss compensation. The method shown in FIG. 5 differs from the method shown in FIG. 3 accordingly by flow loss compensation. The flow loss is due to the reaction time of the low flow cut-off LFC when the low flow cut-off LFC is deactivated. In order to compensate for the flow loss, to compensate for the flow $d_t$ "lost" in the reaction time of the deactivation of the low flow cut-off LFC, the flow $d_t$ is determined in t partial steps, wherein the respective current flow measurement values $a_{akt}$ are added up over t measurements for this purpose. In the embodiment shown, t=m, so the number of flow measurement values $a_{akt}$ added up to determine the flow $d_t$ corresponds to the plurality m of the flow measurement values over which smoothing is carried out to determine the smoothed flow measurement value $d_g$. The flow rate $d_t$ is divided into t flow rate subsets $\Delta d$. When the low flow cut-off LFC is deactivated, a flow portion $\Delta d$ is added to the current output value $a_{akt}$. This is carried out t times, with each addition reducing the value t by one (t=t−1), until t≤1. As soon as t≤1, no further flow portions $\Delta d$ are added to the current output value.

Figure 6:
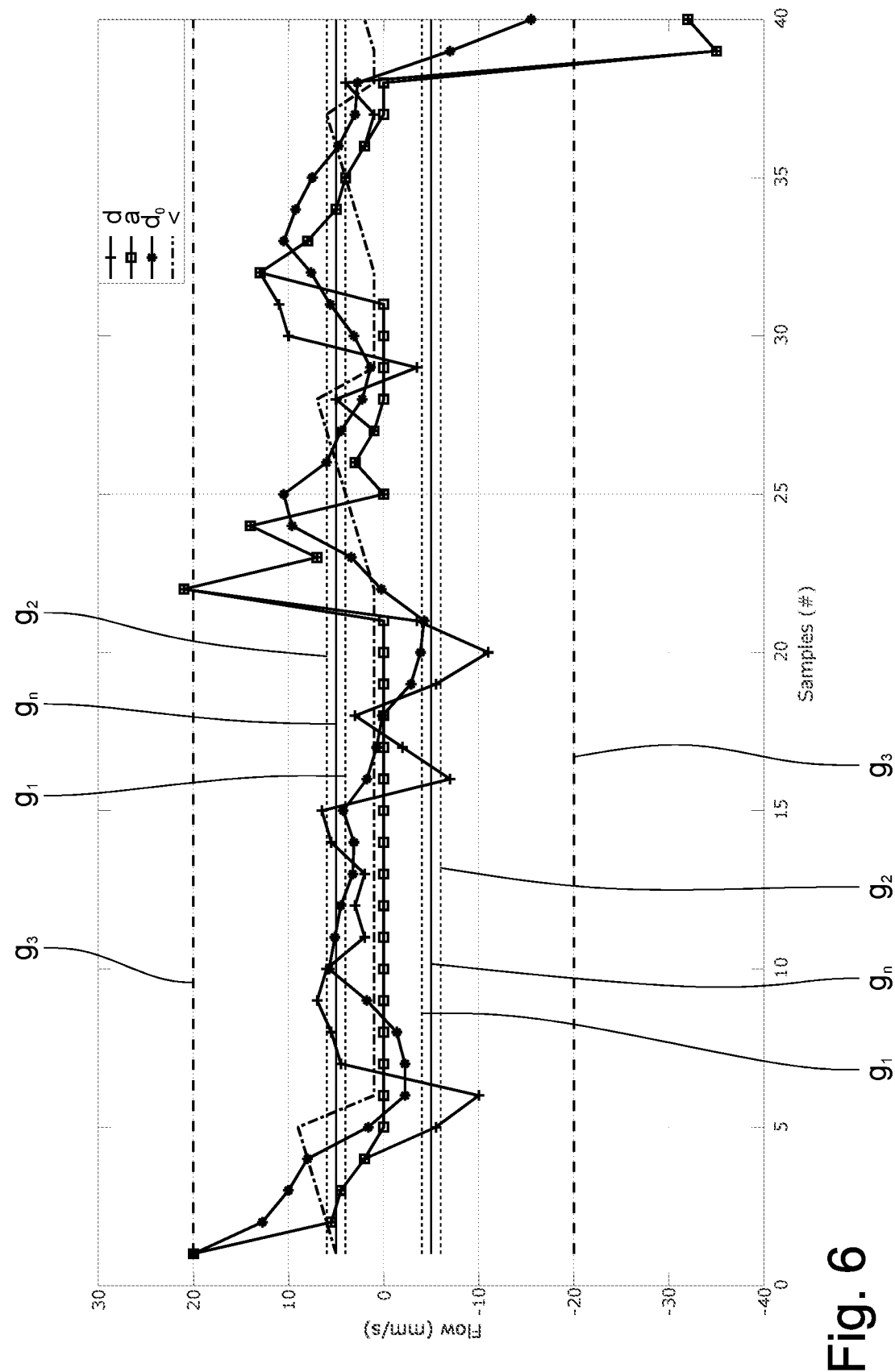
FIG. 6 illustrates an exemplary graphical representation of the time course of individual values.

FIG. 6 shows an example of a graphic representation of the time course of the individual values, namely the flow measurement value d, the output value a and the smoothed flow measurement value $d_g$. Here, the flow rate in millimeters per second (mm/s) is plotted over time in seconds (s). The flow measurement value d is represented by the circular symbols, the output value a is represented by the square symbols, and the smoothed flow measurement value $d_g$ is represented by the star-shaped symbols. In the present case, the smoothed flow measurement value $d_g$ has been formed by taking the simple moving average, where d has been smoothed over four flow measurement values.

The low flow limit value $g_n$ is +/−5 mm/s. The first tolerance value $t_1$ is 1 mm/s, so that the first limit value $g_1$ is +/−4 mm/s and the second limit value $g_2$ is +/−6 mm/s. The second tolerance value $t_2$ is 15 mm/s, so that the third limit value $g_3$ is +/−20 mm/s.

In the first four seconds shown, the respective current smoothed flow measurement values $d_g$ are above the first limit value $g_1$. Accordingly, the respective current output value a corresponds to the respective current flow measurement value d. At time t=5 s, the current smoothed flow measurement value $d_g$ falls to a value below the first limit value $g_1$. Moreover, the number k of smoothed flow measurement values $d_g$ formed with deactivated low flow cut-off LFC is k=9, which is greater than the plurality m=4 of flow measurement values d over which the smoothed flow measurement value $d_g$ is formed. Accordingly, the low flow cut-off LFC is activated and the output value a is set to zero. As can be seen from the graphic representation, the output value is set to zero between t=5 s and t=21 s, since, during that time, the smoothed flow measurement value $d_g$ remains at a value below the first limit $g_1$. At t=22 s, the current flow measurement value d increases to a value above the third limit $g_3$, so that one of the conditions for deactivation of the low flow cut-off LFC is fulfilled. For deactivation, it is only necessary that one of the two possible conditions is fulfilled, so that low flow cut-off LFC is deactivated. The output value a then corresponds again to the flow measurement value d. At time t=23 s, the smoothed flow measurement value $d_g$ is below the first limit value $g_1$, so that one of the conditions for activating the low flow cut-off LFC is fulfilled. However, only one smoothed flow measurement value $d_g$ with deactivated low flow cut-off LFC has been formed, namely at t=22 s, because until t=21 s the low flow cut-off LFC was still activated, so that the second necessary condition for activating the low flow cut-off LFC is not fulfilled. The low flow cut-off LFC is thus not activated, and the output value a corresponds to the flow measurement value d. Only at a time t=28 s are both necessary conditions for activating the low flow cut-off LFC fulfilled, so that it is activated and the output value a is set to zero. At t=32 s, the smoothed flow measurement value $d_g$ increases to a value above the second limit $g_2$. As a result, one of the conditions for deactivating the low flow cut-off LFC is met and the low flow cut-off LFC is deactivated. At t=37 s, the smoothed flow measurement value $d_g$ drops again to a value below the first limit value $g_1$. In addition, more than four smoothed flow measurement values $d_g$ have been formed with deactivated low flow cut-off LFC, thus k>m and the low flow cut-off LFC is activated again and the output value is set to zero. At t=39 s, the current flow measurement value d increases (in magnitude) to a value above the third limit $g_3$, so that the low flow cut-off LFC is deactivated again here.

Figure 8:
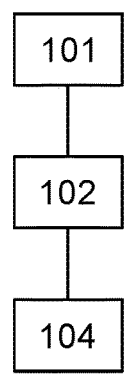
FIG. 8 illustrates a block diagram of a third design of a method for operating a flowmeter.

FIG. 8 shows a block diagram of a method for operating a flowmeter. The method is carried out when the low flow cut-off LFC is activated and relates to the deactivation of the low flow cut-off LFC. In a method step, flow measurement values d are determined. In a further step 102, smoothed flow measurement values $d_g$ are determined over a respective plurality m of flow measurement values d. In a step 104', the low flow cut-off LFC is deactivated if the smoothed flow measurement value $d_g$ is above a second predetermined limit value $g_2$, or if a current determined flow measurement value $d_{akt}$ is above a third predetermined limit value $g_3$. When low flow cut-off LFC is deactivated, an output value a corresponding to the actual flow measurement value d is output.

The invention claimed is:

1. A method for operating a flowmeter, comprising:
    determining flow measurement values for a measured variable of a flow;
    forming smoothed flow measurement values, each over a respective plurality of the flow measurement values;
    outputting a respective output value for each of the flow measurement values;
    setting each respective output value to a current value of the flow measurement values when a low flow cut-off is in a deactivated state;
    transitioning the low flow cut-off from the deactivated state to an activated state only if both of the following conditions are met:
        a current value of the smoothed flow measurement values is below a first predetermined limit value; and
        a predetermined number of the flow measurement values has been determined while the low flow cut-off is in the deactivated state or a predetermined number of the smoothed flow measurement values has been formed while the low flow cut-off is in the deactivated state; and
    setting each respective output value to zero when the low flow cut-off is in the activated state.

2. The method according to claim 1, wherein each of the smoothed flow measurement values is formed by forming a mean value; and
    wherein the mean value is a simple moving average, an exponential moving average, a weighted moving average, an arithmetic mean value, or a harmonic mean value.

3. The method according to claim 2, wherein the predetermined number of the smoothed flow measurement values corresponds to a number of the flow measurement values included in the plurality of flow measurement values over which smoothing is performed.

4. The method according to claim 1, wherein the first predetermined limit value is formed by a low flow limit value minus a first tolerance value.

5. The method according to claim 1, wherein, in a correction step, a zero point correction of the flowmeter is carried out when the low flow cut-off is in the activated state.

6. The method according to claim 1, wherein the following additional method steps are carried out:
    determining or retrieving the reaction time of the low flow cut-off;
    determining the flow rate after deactivation of the low flow cut-off over the period of the reaction time of the low flow cut-off; and
    adding the flow rate determined over the period of the reaction time to an initial value.

7. The method according to claim 6, wherein the flow rate determined over the period of the reaction time is divided into a plurality of flow rate subsets.

8. A method for operating a flowmeter, comprising:
    determining flow measurement values for a measured variable of a flow;
    forming smoothed flow measurement values, each over a respective plurality of the flow measurement values;
    outputting a respective output value for each of the flow measurement values;
    setting each respective output value to zero when a low flow cut-off is in an activated state;
    transitioning the low flow cut-off from the activated state to a deactivated state when either of the following two conditions is satisfied:
        a current value of the smoothed flow measurement values is above a second predetermined limit value; or a current value of the flow measurement values is above a third predetermined limit value; and setting each respective output value to a current value of the flow measurement values when the low flow cut-off is in the deactivated state.

9. The method according to claim 8, wherein the second predetermined limit value is formed from a low flow limit value plus a first tolerance value.

10. The method according to claim 8, wherein the third predetermined limit value is formed from a low flow limit value plus a second tolerance value.

11. A flowmeter for determining a flow rate of a medium, comprising:

a sensor for detecting a measured variable indicating the flow rate, wherein the sensor converts the measured variable into a sensor signal; and a control and evaluation unit, wherein the control and evaluation unit determines a flow measurement value for the flow rate from the sensor signal and outputs an output value representing the flow measurement value;

wherein the control and evaluation unit is designed to carry out the following method steps in the operating state of the flowmeter:

determining flow measurement values;

forming smoothed flow measurement values, each over a respective plurality of the flow measurement values;

outputting a respective output value for each of the flow measurement values;

setting each respective output value to a current value of the flow measurement values when a low flow cut-off is in a deactivated state;

transitioning the low flow cut-off from the deactivated state to an activated state only if both of the following conditions are met:

a current value of the smoothed flow measurement values is below a first predetermined limit value; and a predetermined number of the flow measurement values has been determined while the low flow cut-off is in the deactivated state or a predetermined number of the smoothed flow measurement values has been formed while the low flow cut-off is in the deactivated state; and setting each respective output value to zero when the low flow cut-off is in the activated state.

12. The flowmeter according to claim 11, wherein the control and evaluation unit is further designed to carry out at least one of the following method steps in the operating state of the flowmeter:

forming each of the smoothed flow measurement values by forming a simple moving average, an exponential moving average, a weighted moving average, an arithmetic mean value, or a harmonic mean value;

forming the first predetermined limit value by a low flow limit value minus a first tolerance value;

a correction step, in which a zero point correction of the flowmeter is carried out when the low flow cut-off is in the activated state;

determining or retrieving a reaction time of the low flow cut-off;

determining the flow rate after deactivation of the low flow cut-off over the period of the reaction time of the low flow cut-off; and adding the flow rate determined over the period of the reaction time to the initial value.

13. A flowmeter for determining a flow rate of a medium, comprising:

a sensor for capturing a measured variable indicating the flow, wherein the sensor converts the measured variable into a sensor signal; and a control and evaluation unit, wherein the control and evaluation unit determines a flow measurement value for the flow from the sensor signal and outputs an output value representing the flow measurement value;

wherein the control and evaluation unit is designed in such a way that, in the operating state of the flowmeter, the control and evaluation unit carries out the following method steps:

determining of flow measurement values for a measured variable of a flow;

forming smoothed flow measurement values, each over a respective plurality of flow measurement values;

outputting a respective output value for each of the flow measurement values;

setting each respective output value to zero when a low flow cut-off is in an activated state; transitioning the low flow cut-off from the activated state to a deactivated state when one of the following two conditions is met:

a current value of the smoothed flow measurement values is above a second predetermined limit value; or a current value of the flow measurement values is above a third predetermined limit value; and setting each respective output value to a current value of the flow measurement values when the low flow cut-off is in the deactivated state.

14. The flowmeter according to claim 13, wherein the control and evaluation unit is further designed to carry out at least one of the following method steps in the operating state of the flowmeter:

forming the smoothed flow measurement value by forming a simple moving average, an exponential moving average, a weighted moving average, an arithmetic mean value, or a harmonic mean value;

forming the first predetermined limit value by a low flow limit value minus a first tolerance value;

a correction step, in which a zero point correction of the flowmeter is carried out when the low flow cut-off is in the activated state;

determining or retrieving the reaction time of the low flow cut-off;

determining the flow rate after deactivation of the low flow cut-off over the period of the reaction time of the low flow cut-off; and adding the flow rate determined over the period of the reaction time to the initial value.

* * * * *